US008445604B2

(12) United States Patent
Li et al.

(10) Patent No.: US 8,445,604 B2
(45) Date of Patent: May 21, 2013

(54) THERMOFORMED ARTICLE MADE FROM POLYBUTYLENE SUCCINATE (PBS) AND MODIFIED POLYBUTYLENE SUCCINATE (MPBS)

(75) Inventors: Wei Li, Mason, OH (US); Richard A Tedford, Loveland, OH (US); Bruce J Thoman, Lebanon, OH (US); Thomas Robert Christie, Milford, OH (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 12/948,204

(22) Filed: Nov. 17, 2010

(65) Prior Publication Data
US 2011/0136978 A1 Jun. 9, 2011

Related U.S. Application Data

(60) Provisional application No. 61/267,658, filed on Dec. 8, 2009.

(51) Int. Cl.
*C08G 63/00* (2006.01)

(52) U.S. Cl.
USPC ........... 525/437; 220/592.17; 220/592.28; 428/480; 525/54.2; 525/54.24; 525/410; 525/411; 525/415; 525/418; 525/419; 525/450

(58) Field of Classification Search
USPC ........ 220/592.17, 592.28; 428/480; 525/54.2, 525/54.24, 410, 411, 415, 418, 419, 437, 525/450
See application file for complete search history.

(56) References Cited

U.S. PATENT DOCUMENTS

| 6,207,755 | B1 | 3/2001 | Tsai et al. | |
|---|---|---|---|---|
| 6,953,622 | B2 | 10/2005 | Tsai et al. | |
| 2001/0003761 | A1 | 6/2001 | Ishibashi et al. | |
| 2004/0180990 | A1* | 9/2004 | Suzuki et al. | 523/216 |
| 2006/0036062 | A1 | 2/2006 | Ramakrishna et al. | |
| 2008/0041810 | A1* | 2/2008 | Itoh et al. | 215/316 |

FOREIGN PATENT DOCUMENTS
WO 2010151798 12/2010

OTHER PUBLICATIONS

Takashi Fujimaki: "Processability and properties of aliphatic polyesters, 'BIONOLLE', synthesized by polycondensation reaction", Polymer Degradation and Stability, vol. 59, 1998, pp. 209-214, XP002622704, tables 1, 4.
Bhatia Amita, Rahul K. Gupta, Sati N. Bhattacharya, H.J. Chol: "Compatibility of biodegradable poly(lactic acid) (PLA) and poly(butylene succinate) (PBS) blends for packaging application", Korea-Australia Rheology Journal, vol. 19, No. 3, 2007, pp. 125-131, XP002622676, abstract; paragraph [03.2]; figure 2.
Database CA [Online] Chemical Abstracts Service, Columbus, Ohio, US; Terada, Shigenori et al: "Impact-resistant biodegradable plastic films, sheets, and moldings without deformation at high temperature and humidity", XP002622677, retrieved from STN Database accession n. 127:35562 * abstract JP 9111107 A (Mitsubishi Plastics Ind) Apr. 28, 1997.
S.-M. Lai, C.-K. Huang, H.-F. Shen: "Preparation and Properties of Biodegradable Poly(butylenesucciante)/Starch Blends", Journal of Applied Polymer Science, vol. 97, 2005, pp. 257-264, XP002622705, figures 1, 2; table II.

* cited by examiner

*Primary Examiner* — Robert Jones, Jr.
(74) *Attorney, Agent, or Firm* — Matthew M. Eslami; Eric Guttag

(57) ABSTRACT

The present invention relates to articles made of a thermoformable resin comprising a biodegradable polymer having polybutylene succinate (PBS) via extrusion using an extruder which comprise: a biodegradable polymer having: (a) a $T_s$ value of up to about 160° C. (e.g., in the range of from about 50° to about 150° C.); (b) a heat distortion index of up to about 150° C. (for example, up to about 120° C.); and (c) optionally, a $T_m$ in the range of from about 70° to about 160° C. (e.g., in the range of from about 80° to about 150° C.). Thermoformed article such as a food or beverage cup, lid, cutlery item, foodservice item, molded tray, food storage container, etc provide the ability to resist deformation during higher temperature conditions that may occur during storage and distribution.

10 Claims, 2 Drawing Sheets

THERMOFORMED ARTICLE MADE FROM POLYBUTYLENE SUCCINATE (PBS) AND MODIFIED POLYBUTYLENE SUCCINATE (MPBS)

CROSS REFERENCE TO RELATED APPLICATIONS

This application claims priority to U.S. provisional patent application Ser. No. 61/267,658, filed on 8 Dec. 2009, which is hereby incorporated hereinto by reference as if fully restated herein.

FIELD OF THE INVENTION

The present invention broadly relates to thermoformed articles made of resins comprising pure Polybutylene succinate (PBS), or modified polybutylene succinate (MPBS), or mixture of these two, or blends based on these two via extrusion; their composition, manufacturing, and applications.

BACKGROUND OF THE INVENTION

The use of polymers for various disposable articles is widespread and well known in the art. In fact, the heaviest use of polymers in the form of films and fibers occurs in the packaging and the disposable article industries. Films employed in the packaging industry include those used in food and non-food packaging, merchandise bags and trash bags. In the disposable article industry, the general uses of polymers occurs in the construction of diapers, personal hygiene articles, instrument pads, bandages, and protective covers for various articles.

In light of depleting landfill space and inadequate disposal sites, there is a need for polymers that are water-responsive. Currently, although polymers, such as polyethylene, polypropylene, polyethylene terephthalate, nylon, polystyrene, polyvinyl chloride and polyvinylidene chloride, are popular for their superior extrusion and film and fiber making properties, these polymers are not water-responsive. Furthermore, these polymers are generally non-compostable, which is undesirable from an environmental perspective.

Polymers and polymer blends have been developed which are generally considered to be water-responsive. These are polymers which purportedly have adequate properties to permit them to breakdown when exposed to conditions which lead to composting. Examples of such arguably water-responsive polymers include those made from starch biopolymers and polyvinyl alcohol.

Although materials made from these polymers have been employed in film and fiber-containing articles, many problems have been encountered with their use. Often the polymers and articles made from these polymers are not completely water-responsive or compostable. Furthermore, some water-responsive polymers may also be unduly sensitive to water, either limiting the use of the polymer or requiring some type of surface treatment to the polymer, often rendering the polymer non-water-responsive. Other polymers are undesirable because they have inadequate heat resistance for wide spread use.

Accordingly, it would be desirable to have pure Polybutylene succinate (PBS), or modified polybutylene succinate (MPBS), or mixture of these two, or blends based on these two which have greater resistance to deformation at higher temperatures that may occur during, for example, storage and transportation in warmer, summer time periods, and contact with hot drink and hot food.

SUMMARY OF THE INVENTION

Polybutylene succinate (PBS) is a biodegradable aliphatic polyester with similar properties to PET. PBS is generally blended with other materials, such as bio fillers, mineral fillers, and other polyesters, to form MPBS, and to make its use economical.

PBS and MPBS have excellent mechanical properties and better heat resistance than that of PLA. They can be applied to a range of end applications via conventional melt processing techniques. Currently known applications include mulch film, packaging film, bags and 'flushable' hygiene products.

PLA is a biodegradable polymer that made from corn starch. It has been used to produce a few environment friendly products, like IP's Ecotainer. The limited thermal and mechanical properties of virgin PLA, however, become the restriction of its applications. Adding petroleum chemicals into PLA could improve the performance, but damaged the sustainability of the products. By combining of PLA and other biopolymers, and/or natural fillers, we can have better products, while retain their sustainability. The other biopolymers are, but not limit to, PBS, MPBS, and PHAs. The natural fillers here are, but not limit to, cellulose fibers and powders; agriculture (for examples, rice husk, wheat bran, straw, corn cob . . . ) fibers and powders; wood fibers and powders; and bamboo fibers and powders.

Polylactic acid (PLA) is increasing in favor with consumers of plastic thermoformed articles as a renewable plastic which does not derive from fossil fuels and which is degradable in the environment. As with many thermoplastics, PLA has a decreasing mechanical strength with increasing temperature. At higher temperatures approaching about 140° F. (60° C.), an article formed from PLA may lose the ability to resist deformation by forces frequently found in transportation. At temperatures above about 140° F. (60° C.), PLA may lose its ability to resist deformation to forces of the order of magnitude of gravity and residual mold stress. Prolonged exposure of PLA articles to temperatures of about 140° F. (60° C.) or higher may cause these articles to deform substantially from their original shape under forces which may be present in storage conditions. Since temperatures of about 130° F. (54.4° C.) may be exceeded in railcars and trailers used for distribution, PLA articles may suffer from high damage losses during transport through and storage in hot areas such as tractor trailers crossing, for example, the sunny warmer portions of the United States during the summer.

Accordingly, it would be desirable to have PBS based articles which have greater resistance to deformation at higher temperatures that may occur during, for example, storage and transportation in warmer, summer time periods, and contact with hot drink and hot food.

Accordingly, there is provided an article comprising PBS and MPBS. The new thermoformable resin comprising pure PBS, and/or MPBS, and/or mixture of these two, and/or blends based on these two via extrusion. The resins can then be used in thermoforming, injection molding, and extrusion coating.

The present invention relates to articles made of a thermoformable resin comprising a biodegradable polymer having polybutylene succinate (PBS) via extrusion using an extruder which comprise: a biodegradable polymer having: (a) a $T_s$ value of up to about 160° C. (e.g., in the range of from about 50° to about 150° C.); (b) a heat distortion index of up to about 150° C. (for example, up to about 120° C.); and (c) optionally, a $T_m$ in the range of from about 70° to about 160° C. (e.g., in the range of from about 80° to about 150° C.). Thermoformed article such as a food or beverage cup, lid, cutlery item, foodservice item, molded tray, food storage container, etc provide the ability to resist deformation during higher temperature conditions that may occur during storage and distribution.

One aspect of the present invention is directed to an article made of a thermoformable resin comprising a biodegradable polymer having polybutylene succinate (PBS) via extrusion using an extruder. The article is in the form of a beverage lid. The biodegradable polymer has a $T_s$ value up to about 150° C. The biodegradable polymer has a heat distortion index of up to about 140° C. The biodegradable polymer has a $T_m$ in the range of from about 40° to about 250° C. The extruder is a co-rotating, twin-screw extruder or counter-rotating, twin-screw extruder.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
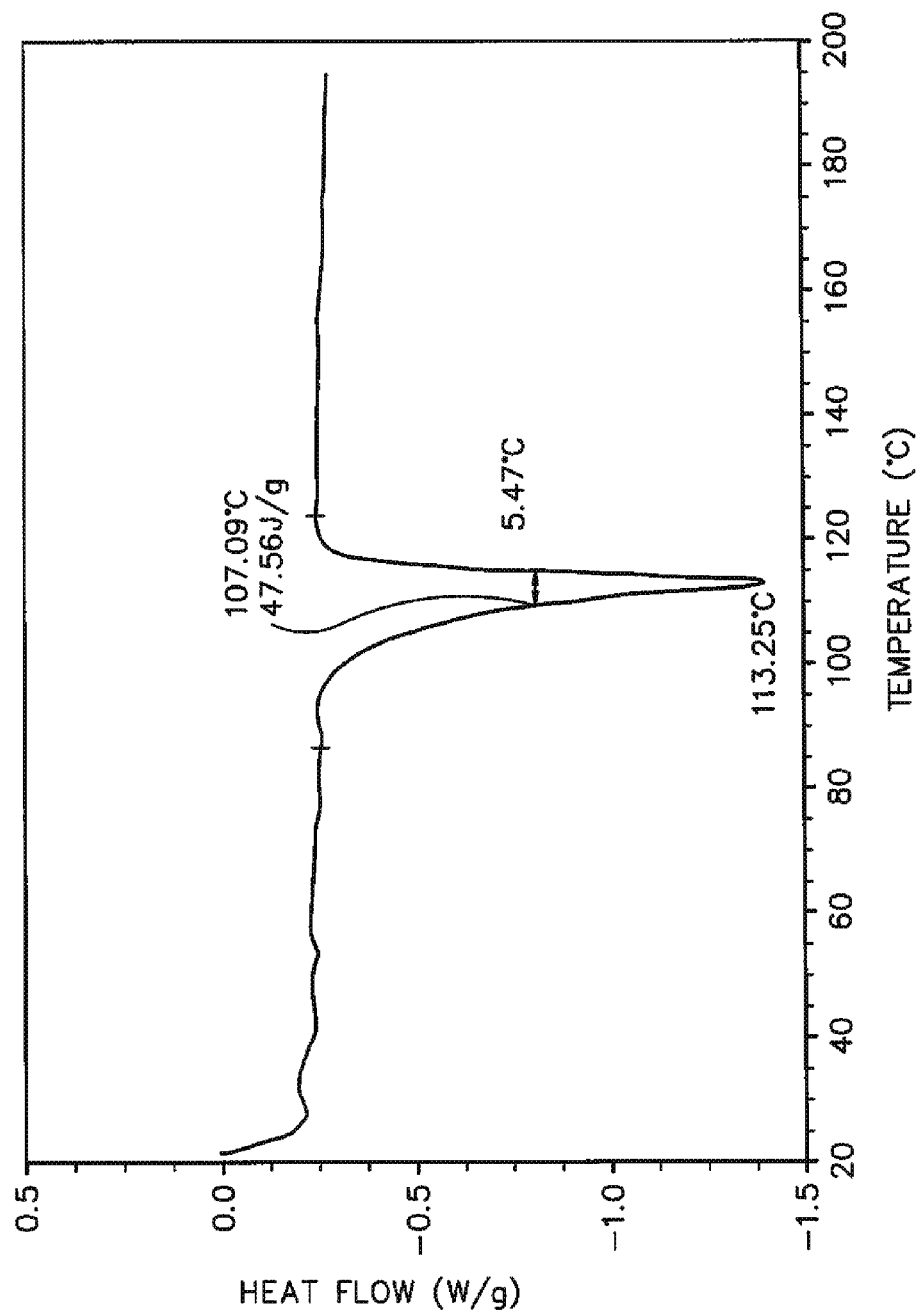
FIG. 1 is a graph that shows a Differential Scanning Calorimetry (DSC) Spectrum of the first scan of PBS.

It is advantageous to define several terms before describing the invention. It should be appreciated that the following definitions are used throughout this application.

DEFINITIONS

Where the definition of terms departs from the commonly used meaning of the term, applicant intends to utilize the definitions provides below, unless specifically indicated.

For the purposes of the present invention, the term "renewable polymer" (also known as "biopolymer") refers to a polymer, or a combination (e.g., blend, mixture, etc.) of polymers, which may be obtained from renewable natural resources, e.g., from raw or starting materials which are or may be replenished within a few years (versus, for example, petroleum which requires thousands or millions of years). For example, a renewable polymer may include a polymer that may be obtained from renewable monomers, polymers which may be obtained from renewable natural sources (e.g., starch, sugars, lipids, corn, sugar beet, wheat, other, starch-rich products etc.) by, for example, enzymatic processes, bacterial fermentation, other processes which convert biological materials into a feedstock or into the final renewable polymer, etc. See, for example, U.S. Pat. App. No. 20060036062 (Ramakrishna et al.), published Feb. 16, 2006, the entire disclosure and contents of which is hereby incorporated by reference. Renewable polymers useful in embodiments of the present invention may include polyhydroxyalkanoate polymers, polycaprolactone (PC frame face shipping and displaying L) polymers, starch-based polymers, cellulose-based polymers, etc., or combinations thereof Renewable polymers may, but do not necessarily include, biodegradable polymers.

For the purposes of the present invention, the term "biodegradable polymer" refers to a polymer which may be broken down into organic substances by living organisms, for example, microorganisms.

For the purposes of the present invention, the term "amorphous" refers to a solid which is not crystalline, i.e., has no lattice structure which is characteristic of a crystalline state.

For the purposes of the present invention, the term "crystalline" refers to a solid which has a lattice structure which is characteristic of a crystalline state.

For the purposes of the present invention, the term "high temperature deformation-resistant material" refers to a material which resists deformation at a temperature of about 140° F. (60° C.) or higher, for example, about 150° F. (65.6° C.) or higher.

For the purposes of the present invention, the term "high temperature deformable material" refers to a material which deforms at a temperature of less than about 140° F. (60° C.), for example, less than about 130° F. (54.4° C.).

For the purposes of the present invention, the term "thermoforming" refers to a method for preparing a shaped, formed, etc., article from a thermoplastic sheet, film, etc. In thermoforming, the sheet, film, etc., may be heated to its melting or softening point, stretched over or into a temperature-controlled, single-surface mold and then held against the mold surface until cooled (solidified). The formed article may then be trimmed from the thermoformed sheet. The trimmed material may be reground, mixed with virgin plastic, and reprocessed into usable sheet. Thermoforming may include vacuum forming, pressure forming, twin-sheet forming, drape forming, free blowing, simple sheet bending, etc.

For the purposes of the present invention, the term "thermoform" and similar terms such as, for example "thermoformed," etc., refers to articles made by a thermoforming method.

For the purposes of the present invention, the term "service temperature", refers to temperature of hot liquid.

For the purposes of the present invention, the term "melting point" refers to the temperature range at which a crystalline material changes state from a solid to a liquid, e.g., may be molten. While the melting point of material may be a specific temperature, it often refers to the melting of a crystalline material over a temperature range of, for example, a few degrees or less. At the melting point, the solid and liquid phase of the material often exists in equilibrium.

For the purposes of the present invention, the term "$T_m$," refers to the melting temperature of a material, for example, a polymer. The melting temperature is often a temperature range at which the material changes from a solid state to a liquid state. The melting temperature may be determined by using a differential scanning calorimeter (DSC) which determines the melting point by measuring the energy input needed to increase the temperature of a sample at a constant rate of temperature change, and wherein the point of maximum energy input determines the melting point of the material being evaluated.

For the purposes of the present invention, the term "softening point" refers to a temperature or range of temperatures at which a material is or becomes shapeable, moldable, formable, deformable, bendable, extrudable, etc. The term softening point may include, but does not necessarily include, the term melting point.

For the purposes of the present invention, the term "$T_s$" refers to the Vicat softening point (also known as the Vicat Hardness). The Vicat softening point is measured as the temperature at which a polymer specimen is penetrated to a depth of 1 mm by a flat-ended needle with a 1 sq. mm circular or square cross-section. A load of 9.81 N is used. Standards for measuring Vicat softening points for thermoplastic resins may include JIS K7206, ASTM D1525 or ISO306, which are incorporated by reference herein.

For the purposes of the present invention, the term "$T_g$" refers to the glass transition temperature. The glass transition temperature is the temperature: (a) below which the physical properties of amorphous materials vary in a manner similar to those of a solid phase (i.e., a glassy state); and (b) above which amorphous materials behave like liquids (i.e., a rubbery state).

For the purposes of the present invention, the term "heat deflection temperature (HDT)" or heat distortion temperature (HDTUL) (collectively referred to hereafter as the "heat distortion index (HDI)") is the temperature at which a polymer deforms under a specified load. HDI is a measure of the resistance of the polymer to deformation by heat and is the temperature (in ° C.) at which deformation of a test sample of the polymer of predetermined size and shape occurs when subjected to a flexural load of a stated amount. HDI may be determined by following the test procedure outlined in ASTM D648, which is herein incorporated by reference. ASTM D648 is a test method which determines the temperature at which an arbitrary deformation occurs when test samples are subjected to a particular set of testing conditions. This test provides a measure of the temperature stability of a material, i.e., the temperature below which the material does not readily deform under a standard load condition. The test sample is loaded in three-point bending device in the edgewise direction. The outer fiber stress used for testing is 1.82 MPa, and the temperature is increased at 2° C./min until the test sample deflects 0.25 mm.

For the purposes of the present invention, the term "melt flow index (MFI)" (also known as the "melt flow rate (MFR)") refers to a measure of the ease of flow of the melt of a thermoplastic polymer, and may be used to determine the ability to process the polymer in thermoforming. MFI may be defined as the weight of polymer (in grams) flowing in 10 minutes through a capillary having a specific diameter and length by a pressure applied via prescribed alternative gravimetric weights for alternative prescribed temperatures. Standards for measuring MFI include ASTM D1238 and ISO 1133, which are herein incorporated by reference. The testing temperature used is 190° C. with a loading weight of 2.16 kg. For thermoforming according to embodiments of the present invention, the MFI of the polymers may be in the range from 0 to about 20 grams per 10 minutes, for example from 0 to about 15 grams per 10 minutes.

For the purposes of the present invention, the terms "viscoelasticity" and "elastic viscosity" refer interchangeably to a property of materials which exhibit both viscous and elastic characteristics when undergoing deformation. Viscous materials resist shear flow and strain linearly with time when a stress is applied, while elastic materials strain instantaneously when stretched and just as quickly return to their original state once the stress is removed. Viscoelastic materials have elements of both of these properties and, as such, exhibit time dependent strain. Whereas elasticity is usually the result of bond stretching along crystallographic planes in an ordered solid, viscoelasticity is the result of the diffusion of atoms or molecules inside of an amorphous material.

For the purposes of the present invention, the term "hydroxy aliphatic acids" refers to organic aliphatic carboxylic acids having a hydroxy group, and which may be used to provide polyhydroxyalkanoates. Hydroxy aliphatic acids useful herein may include lactic acid, hydroxy-beta-butyric acid (also known as hydroxy-3-butyric acid), hydroxy-alpha-butyric acid (also known as hydroxy-2-butyric acid), 3-hydroxypropionic acid, 3-hydroxyvaleric acid, 4-hydroxybutyric acid, 4-hydroxyvaleric acid, 5-hydroxyvaleric acid, 3-hydroxyhexanoic acid, 4-hydroxyhexanoic acid, 6-hydroxyhexanoic acid, hydroxyacetic acid (also known as glycolic acid), lactic acid (also know as hydroxy-alpha-propionic acid), malic acid (also known as hydroxysuccinic acid), etc., and mixtures thereof.

For the purposes of the present invention, the term "polylactic acid or polylactide (PLA)" refers to a renewable, biodegradable, thermoplastic, aliphatic polyester formed from a lactic acid or a source of lactic acid, for example, renewable resources such as corn starch, sugarcane, etc. The term PLA may refer to all stereoisomeric forms of PLA including L- or D-lactides, and racemic mixtures comprising L- and D-lactides. For example, PLA may include D-polylactic acid, L-polylactic acid (also known as PLLA), D,L-polylactic acid, meso-polylactic acid, as well as any combination of D-polylactic acid, L-polylactic acid, D,L-polylactic acid and meso-polylactic acid. PLAs useful herein may have, for example, a number average molecular weight in the range of from about 15,000 and about 300,000. In preparing PLA, bacterial fermentation may be used to produce lactic acid, which may be oligomerized and then catalytically dimerized to provide the monomer for ring-opening polymerization. PLA may be prepared in a high molecular weight form through ring-opening polymerization of the monomer using, for example, a stannous octanoate catalyst, tin(II) chloride, etc.

For the purposes of the present invention, the term "cellulose-based polymer" refers to a polymer, or combination of polymers, which may be derived from, prepared from, etc., cellulose. Cellulose-based polymers which may be used in embodiments of the present invention may include, for example, cellulose esters, such as cellulose formate, cellulose acetate, cellulose diacetate, cellulose propionate, cellulose butyrate, cellulose valerate, mixed cellulose esters, etc., and mixtures thereof.

For the purposes of the present invention, the term "mineral filler" refers to inorganic materials, often in particulate form, which may lower cost (per weight) of the polymer, and which, at lower temperatures, may be used to increase the stiffness and decrease the elongation to break of the polymer, and which, at higher temperatures, may be used to increase the viscosity of the polymer melt. Mineral fillers which may used in embodiments of the present invention may include, for example, talc, calcium chloride, titanium dioxide, clay, synthetic clay, gypsum, calcium carbonate, magnesium carbonate, calcium hydroxide, calcium aluminate, magnesium carbonate mica, silica, alumina, sand, gravel, sandstone, limestone, crushed rock, bauxite, granite, limestone, glass beads, aerogels, xerogels, fly ash, fumed silica, fused silica, tabular alumina, kaolin, microspheres, hollow glass spheres, porous ceramic spheres, ceramic materials, pozzolanic materials, zirconium compounds, xonotlite (a crystalline calcium silicate gel), lightweight expanded clays, perlite, vermiculite, hydrated or unhydrated hydraulic cement particles, pumice, zeolites, exfoliated rock, etc., and mixtures thereof For the purposes of the present invention, the term "molded" refers to any method for casting, shaping, forming, extruding, etc., softened or melted polymers, layers, composites, etc., of the present invention.

For the purposes of the present invention, the term "blow molded" refers to a method of molding in which the material is melted and extruded into a hollow tube (also referred to as a parison). This parison may then be captured by closing it into a cooled mold and air is then blown into the parison, thus inflating parison into the shaped article. After the shaped article has cooled sufficiently, the mold is opened and the article is released (e.g., ejected).

For the purposes of the present invention, the term "compression molded" refers to a method of molding in which the molding material, with optional preheating, is first placed in an open, heated mold cavity. The mold is closed with a top force or plug member, pressure is applied to force the material into contact with all mold areas, and heat and pressure are maintained until the molding material has cured.

For the purposes of the present invention, the term "heat-resistant polymer" refers to a polymer (or polymers) which has an HDI value of greater than about 50° C., for example greater than about 65° C. (e.g., greater than about 90° C.). In other words, heat-resistant polymers are resistant to deformation at temperatures above about 50° C., for example, above about 65° C. (e.g., above about 90° C.). Heat-resistant polymers may or may not renewable polymers and may include polyolefins (e.g., polyethylene, polypropylene, etc.), polystyrenes, polyesters, polyamides, polyimides, polyurethanes, cellulose-based polymers, such as cellulose propionate, etc., and combinations thereof.

For the purposes of the present invention, the term "sheet" refers to webs, strips, films, pages, pieces, segments, etc., which may be continuous in form (e.g., webs) for subsequent subdividing into discrete units, or which may be in the form of discrete units (e.g., pieces).

For the purposes of the present invention, the term "extrusion" refers to a method for shaping, molding, forming, etc., a material by forcing, pressing, pushing, etc., the material through a shaping, forming, etc., device having an orifice, slit, etc., for example, a die, etc. Extrusion may be continuous (producing indefinitely long material) or semi-continuous (producing many short pieces, segments, etc.).

For the purposes of the present invention, the term "thermoplastic" refers to the conventional meaning of thermoplastic, i.e., a composition, compound, material, etc., that exhibits the property of a material, such as a high polymer, that softens when exposed to sufficient heat and generally returns to its original condition when cooled to room temperature. Thermoplastics may include, but are not limited to, polyesters (e.g., polyhydroxyalkanoates, polyethyleneterephthalate, etc.), poly(vinylchloride), poly(vinyl acetate), polycarbonates, polymethylmethacrylate, cellulose esters, poly(styrene), poly(ethylene), poly(propylene), cyclic olefin polymers, poly(ethylene oxide), nylons, polyurethanes, protein polymers, etc.

For the purposes of the present invention, the term "significant weight amount" refers to an amount of the renewable polymer which may be at least about 50% by weight of the composite, for example, at least about 80% by weight, (e.g., at least about 90% by weight) of the composite.

DESCRIPTION

Much work has been done on modifying PLA to survive storage and distribution conditions involving higher temperatures (e.g., above about 140° F. (60° C.)) that may cause deformation of articles comprising PLA due to gravity, residual mold stress, etc. The mechanical strength of the PLA articles under slow temperature changes and small strain rates may be dominated by the strength of the continuous phase. While heat distortion temperature may be a widely used analysis method throughout the plastics industry, it has different mechanical conditions which may not be relevant to the storage condition issue.

In embodiments of the present invention, articles comprising a thermoformable composite are provided which comprise: a renewable polymer having: (a) a $T_s$ value of up to about 160° C. (e.g., in the range of from about 50° to about 150° C.); (b) a heat distortion index of up to about 150° C. (for example, up to about 130° C.); and (c) optionally, a $T_m$ in the range of from about 70° to about 160° C. (e.g., in the range of from about 80° to about 150° C.). Such articles provide the ability to resist deformation during higher temperature conditions that may occur during storage and distribution.

One embodiment of the present invention may be a thermoformed article such as a food or beverage cup, lid, cutlery item, foodservice item, molded tray, food storage container, etc. Another embodiment of the present invention may be an article wherein the one or more of the resins may comprise one or more mineral fillers, for example, talc, calcium chloride, titanium dioxide, clay, etc., or mixtures thereof.

Another embodiment of the present invention may be an article wherein the resin may comprise a compatibilizer which enhances reextrusion of polymer or plastic trim pieces obtained during trimming of the article which may be used in thermoforming recycle operations.

Another embodiment of the present invention may be an article formed by compression molding or blow molding the thermoformable composite. Another embodiment of the present invention may be an article formed from an extruded sheet from a roll fed through thermoforming operation, for example, with inline extrusion and thermoforming with recycle of trimmed polymer or plastic for regrinding.

Referring to the drawings, an embodiment an article comprising a thermoformable laminate composite according to the present invention is illustrated in FIG. 1 in the form of, for example, a beverage lid, indicated as 100. Beverage lid 100 comprises an outer rim portion, indicated as 104, a center portion, indicated as 108, and a main body portion, indicated as 112, connecting center portion 108 and rim portion 104.

Figure 2:
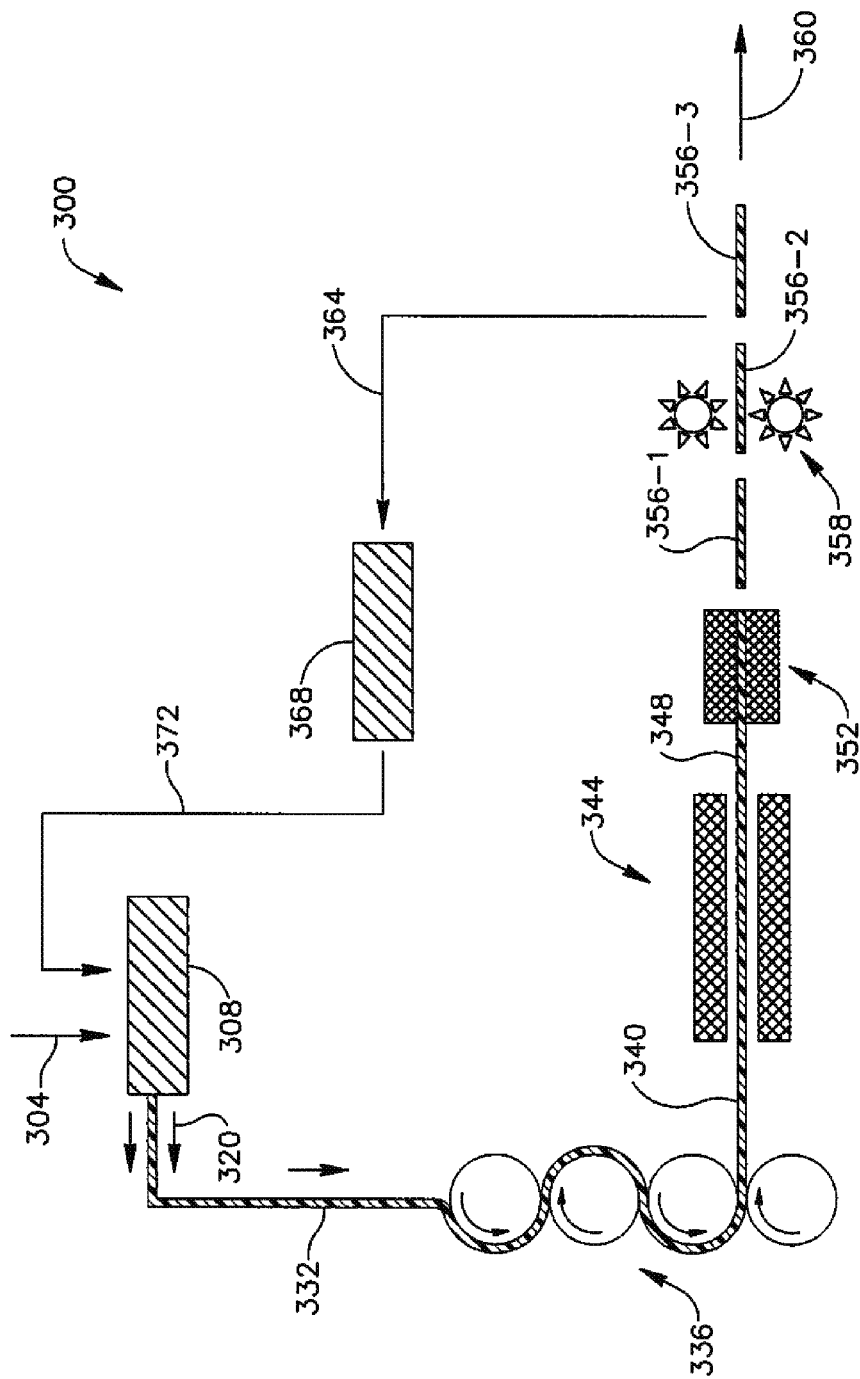
FIG. 2 is a thermoforming system, where pellets of a biodegradable polymer such as PLA-PHA blend, are added to the extruder.

An embodiment of the method of the present invention for preparing a thermoformed article is further schematically illustrated in FIG. 2 which shows thermoforming system, indicated generally as 300. In system 300, pellets of a renewable polymer such as PBS or MPBS, are added, as indicated by arrow 304, to the extruder, indicated as 308, and processed at a temperature in the range of, for example, from about 130° to about 300° C. (e.g., from about 150° to about 225° C.).

The melted resin passes through a series chill rolls, indicated generally as 336. Cold web 340 passes through a remelt oven, indicated as generally 344, where cold web 340 is softened or melted at a temperature, for example, in the range of from about 100° to about 200° C. (e.g., from about 120° to about 180° C.), to provide a thermoformable web, indicated generally as 348. Thermoformable web 348 is passed through a thermoforming or molding section at a temperature, for example, in the range of from about 10° to about 100° C. (e.g., from about 20° to about 80° C.), indicated generally as 352, to provide a thermoformed or molded articles, of three are schematically shown and indicated as 356-1, 356-2 and 356-3. Thermoformed article 356-2 is shown as passing through a trimmer press 358 for remove excess material (e.g., flashing) to provide finished article 356-3, which may then exits system 300, as indicated by arrow 360.

The trimmed material from article 356-2 may be recycled, as indicated by arrow 364. Recycled material 364 is sent to a chopper or grinder, indicated as 368, to provide size reduced recycled material. The size reduced recycled material is then returned, as indicated by arrow 372 for blending with PBS or MPBS pellets in extruder 308.

EXAMPLES

General formulations of composite polymers are shown below:

Sample: The Polybutylene succinate (PBS) resin pellets was provided by Sinoven Biopolymers, Inc., PBS 0812161P.

The resin pellets was extruded into 17 mil thickness sheet stock on a single screw extruder (Davis Standard 3½" diameter, 32:1 L/D.); and then the sheet stock was thermoformed into hot drink lids.

FIG. 1 is the DSC spectrum of PBS resin. It shows that the PBS resin has a melt temperature $T_m$ at 113° C., which is higher than the service temperature of hot drink (normally around 90° C.).

The performances of the PBS lids were tested. The results are list in Table 1.

TABLE 1

PBS lids Performance Data

| Item | Results |
|---|---|
| Average lid Mass, gram | 5.2 |
| Leaking rate*, gram/20 sec., 85° C. | 0.9292 |
| Reliability test**, drop #/12, 90° C. | 0 |

Note:
*the Leaking rate is the leaking from the side seam of a cup/lid system. While the cup with lid is placed in a level position, measure the weight of water collected in 20 seconds. The 0.9292 value is within our QC control limit.
**the Reliability test is to turn a capped cup with hot water inside upside down for 2 minutes, and count the number of the lids dropped per 12 tests.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A hot beverage cup lid made of a thermoformable resin composition comprising a biodegradable polymer comprising polybutylene succinate (PBS), and optionally comprising a filler, wherein, when present, the filler is a natural filler selected from the group consisting of cellulose fibers and powders, wherein the biodegradable polymer composition has a) a heat distortion index of from 50° C. to 140° C., b) a Tm in the range of 40° C. to 250° C., and c) a Ts value in the range of 60° C. to 150° C. wherein the heat distortion index is the temperature at which a polymer deforms under a specified load as determined by test procedure ASTM D648, Tm is the melting temperature of the polymer, and the Ts refers to the Vicat softening point wherein the Vicat softening point is measured as the temperature at which a polymer specimen is penetrated to a depth of 1 mm by a flat-ended needle with a 1 sq. mm circular or square cross-section.

2. The lid of claim 1 wherein the biodegradable polymer composition further comprises a polyhydroxyalkanoate polymer, a polycaprolactone polymer, a starch-based polymer, a cellulose-based polymer, or combination thereof.

3. The lid of claim 2 wherein the biodegradable polymer composition further comprises a polyhydroxyalkanoate polymer.

4. The lid of claim 3 wherein the polyhydroxyalkanoate polymer comprises one or more of poly-beta-hydroxybutyrate, poly-alpha-hydroxybutyrate, poly-3-hydroxypropionate, poly-3-hydroxyvalerate, poly-4-hydroxybutyrate, poly-4-hydroxyvalerate, poly-5-hydroxyvalerate, poly-3-hydroxyhexanoate, poly-4-hydroxyhexanoate, poly-6-hydroxyhexanoate, polyhydroxybutyrate-valerate, polyglycolic acid, or polylactic acid.

5. The lid of claim 3 wherein the polyhydroxyalkanoate polymer comprises polylactic acid.

6. The lid of claim 5 wherein the polylactic acid has a number average molecular weight in the range of from about 15,000 and about 300,000.

7. The lid of claim 6 wherein the biodegradable polymer composition further comprises a starch-based polymer, or a combination of a starch-based polymer and a polyhydroxyalkanoate polymer.

8. The lid of claim 1 wherein the lid is extruded with a co-rotating, twin-screw extruder.

9. The lid of claim 1 wherein the lid is extruded with a counter-rotating, twinscrew extruder.

10. The article of claim 1 wherein the biodegradable polymer composition has a Tm in the range of 80° C. to 150° C.

* * * * *